(12) United States Patent
Ganesh et al.

(10) Patent No.: US 11,134,051 B2
(45) Date of Patent: Sep. 28, 2021

(54) APPARATUS AND METHOD FOR MANAGING NOTIFICATION

(71) Applicant: SAMSUNG ELECTRONICS CO., LTD., Suwon-si (KR)

(72) Inventors: Ariyalur Chandrasekaran Ganesh, Tamil Nadu (IN); Ilavarasu Jayabalan Ellan, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 15/708,867

(22) Filed: Sep. 19, 2017

(65) Prior Publication Data

US 2018/0083913 A1    Mar. 22, 2018

(30) Foreign Application Priority Data

Sep. 19, 2016  (IN) .............................. 201641031923
Mar. 28, 2017  (IN) .............................. 201641031923

(51) Int. Cl.
| | | |
|---|---|---|
| H04L 12/58 | (2006.01) |
| G06F 40/40 | (2020.01) |
| G06F 3/0484 | (2013.01) |
| G06F 3/0481 | (2013.01) |
| G06F 3/0488 | (2013.01) |

(52) U.S. Cl.
CPC ............ *H04L 51/36* (2013.01); *G06F 3/0484* (2013.01); *G06F 40/40* (2020.01); *H04L 51/24* (2013.01); *G06F 3/04817* (2013.01); *G06F 3/04883* (2013.01)

(58) Field of Classification Search
CPC ........ H04L 51/36; H04L 51/24; G06F 3/0484; G06F 3/04817; G06F 3/04883; G06F 17/28; G06F 40/40
See application file for complete search history.

(56) References Cited

U.S. PATENT DOCUMENTS 10,034,129 B1 *   7/2018  Ellis .................... H04L 51/20
2004/0225718 A1 * 11/2004  Heinzel ............... G06Q 10/107
                                              709/206

(Continued)

FOREIGN PATENT DOCUMENTS

| EP | 2863299 A1 | 4/2015 |
|---|---|---|
| KR | 1020130045019 A | 5/2013 |
| KR | 1020140022977 A | 2/2014 |

OTHER PUBLICATIONS

International Search Report and Written Opinion (PCT/ISA/210 and PCT/ISA/237), dated Jan. 12, 2018 by International Searching Authority in International Application No. PCT/KR2017/010164.

(Continued)

*Primary Examiner* — Jeremy L Stanley
(74) *Attorney, Agent, or Firm* — Sughrue Mion, PLLC

(57) ABSTRACT

A method for managing notifications in an electronic device is provided. The method may include displaying at least one notification message, associated with a first application, in a notification area of the electronic device; detecting a first user input performed on the at least one notification message displayed in the notification area; and displaying a graphical element including at least one data item corresponding to the at least one notification message within the notification area, where the at least one data item is associated with a second application.

19 Claims, 13 Drawing Sheets

(56) References Cited

U.S. PATENT DOCUMENTS

| | | | | |
|---|---|---|---|---|
| 2009/0067592 | A1* | 3/2009 | Morris | H04L 51/36 379/88.17 |
| 2011/0084807 | A1* | 4/2011 | Logan | H04W 4/029 340/10.1 |
| 2012/0254634 | A1* | 10/2012 | Chakra | G06F 1/28 713/300 |
| 2012/0295672 | A1* | 11/2012 | Kim | H04W 52/0264 455/573 |
| 2013/0159941 | A1 | 6/2013 | Langlois et al. | |
| 2013/0290879 | A1 | 10/2013 | Greisson | |
| 2013/0321314 | A1* | 12/2013 | Oh | G06F 3/0416 345/173 |
| 2014/0143684 | A1* | 5/2014 | Oh | H04L 51/04 715/752 |
| 2014/0282085 | A1* | 9/2014 | Hsu | H04L 51/24 715/752 |
| 2014/0335832 | A1* | 11/2014 | Yu | H04M 3/537 455/412.2 |
| 2014/0337790 | A1* | 11/2014 | Kim | G06F 3/0482 715/781 |
| 2015/0113436 | A1* | 4/2015 | Penha | G06F 3/0481 715/752 |
| 2015/0113471 | A1* | 4/2015 | Engstrom | G06F 3/0481 715/781 |
| 2015/0271128 | A1 | 9/2015 | Mantey et al. | |
| 2016/0018954 | A1 | 1/2016 | Park et al. | |
| 2016/0044153 | A1* | 2/2016 | Kim | H04M 1/72522 455/418 |
| 2016/0073351 | A1* | 3/2016 | Cardozo | G06F 1/28 455/574 |
| 2016/0226713 | A1* | 8/2016 | Dellinger | H04M 1/7253 |
| 2016/0330150 | A1* | 11/2016 | Joe | H04L 51/046 |
| 2016/0335328 | A1* | 11/2016 | Lampert | H04W 4/60 |
| 2016/0360382 | A1* | 12/2016 | Gross | G06F 3/0488 |
| 2017/0132019 | A1* | 5/2017 | Karashchuk | H04W 4/12 |
| 2017/0277424 | A1* | 9/2017 | Witkowski | G06F 3/04883 |
| 2017/0308590 | A1* | 10/2017 | Ramesan | G06Q 30/02 |
| 2017/0353414 | A1* | 12/2017 | Ertmann | H04L 51/32 |
| 2018/0006973 | A1* | 1/2018 | Hays | H04L 51/02 |
| 2018/0026920 | A1* | 1/2018 | Chen | H04L 51/04 455/466 |
| 2018/0027110 | A1* | 1/2018 | Bakir | H04W 4/185 455/466 |
| 2018/0032997 | A1* | 2/2018 | Gordon | G06Q 30/0269 |
| 2018/0034755 | A1* | 2/2018 | Saoji | G06Q 30/0269 |
| 2018/0039621 | A1* | 2/2018 | Scronce | H04L 51/046 |
| 2018/0041623 | A1* | 2/2018 | Song | H04M 1/72522 |
| 2018/0167477 | A1* | 6/2018 | Xie | H04W 68/02 |
| 2019/0005024 | A1* | 1/2019 | Somech | G06F 16/243 |
| 2019/0334782 | A1* | 10/2019 | Dellinger | H04L 41/12 |

OTHER PUBLICATIONS

Search Report dated Jun. 25, 2019 by the European Patent Office in counterpart European Patent Application No. 17851131.7.

Communication dated Apr. 1, 2020, from the European Patent Office in counterpart European Application No. 17851131.7.

Communication dated Jun. 1, 2020, from the Intellectual Property Office of India in Application No. 201641031923.

\* cited by examiner

APPARATUS AND METHOD FOR MANAGING NOTIFICATION

CROSS-REFERENCE TO RELATED APPLICATIONS

This application claims priority from Indian Patent Application No. 201641031923, filed on Sep. 19, 2016 and Indian Patent Application No. 201641031923, filed on Mar. 28, 2017 in the Indian Patent Office, the entire disclosures of each of which are hereby incorporated in their entireties by reference.

BACKGROUND

1. Field of the Disclosure

The present disclosure relates to natural language processing (NLP), more particularly to an apparatus and method for message notification management.

2. Description of the Related Art

In general, electronic devices such as smartphones and tablet computers are constantly evolving into more complex devices with increasing computational and storage capacity. As the electronic devices continue to evolve, users of these electronic devices are storing an increasing amount of data (e.g., applications, user data) in order to satisfy their requirements.

Further, it is very cumbersome for the user to execute and access an increasing number of applications associated with an ever increasing number of services through their electronic devices. The user must often navigate through a series of menus and screens associated with different applications or services to find and retrieve information that the user seeks.

The increasing number of applications and services used to find information is making it increasingly more difficult for users to retrieve the information they seek.

SUMMARY

Provided is a method for managing notifications in an electronic device.

According to an aspect of an example embodiment, a method may include displaying at least one notification message, associated with a first application, in a notification area of the electronic device; detecting a first user input performed on the at least one notification message displayed in the notification area; and displaying a graphical element including at least one data item corresponding to the at least one notification message within the notification area, the at least one data item being associated with a second application.

The at least one data item may further be associated with at least one of a user interest and an event.

The method may further include: detecting at least one of content and context of the at least one notification message using natural language processing (NLP); determining a relationship between the at least one of the content and the context of the at least one notification message and data items associated with a plurality of applications available in the electronic device; and identifying the at least one data item associated with the second application, from the plurality of applications, based on the relationship.

The relationship may be determined by contextually linking the at least one of the content and the context of the at least one notification message with the data items associated with the plurality of applications available in the electronic device.

Displaying the graphical element may include displaying the graphical element within the notification area without opening the second application.

The method may further include grouping the at least one notification message to yield grouped notification messages, based on the first user input when the at least one notification message includes a plurality of notification messages.

The method may further include detecting a second user input performed on the grouped notification messages. The graphical element may be displayed within the notification area based on the second user input.

Grouping the at least one notification message may further include: detecting at least one of content and context of the plurality of notification messages based on the first user input; determining a relationship among the plurality of notification messages; and grouping the plurality of notification messages based on the relationship.

The relationship may be determined by contextually linking first content of one notification message with second content of another notification message from the plurality of notification messages based on the first user input.

A number of notification messages, from the plurality of notification messages, for grouping may be automatically selected based on at least one of an area covered by the first user input and the plurality of notification messages on which the first user input is performed.

Grouping the at least one notification message may further include: detecting at least one of content and context of the grouped notification messages using natural language processing (NLP); determining a relationship between the at least one of the content and the context of the grouped notification messages and the at least one data item associated with the second application; and determining the at least one data item based on the relationship.

The relationship may be determined by contextually linking the content of the grouped notification messages with the at least one data item associated with the second application.

The at least one data item may be displayed within the notification area without opening the second application.

According to an aspect of an example embodiment, an electronic device for managing notifications may include a processor, and a computer-readable storage medium storing instructions. The instructions, when executed by the processor, may cause the processor to: display at least one notification message, associated with a first application, in a notification area of the electronic device; detect a first user input performed on the at least one notification message displayed in the notification area; and display a graphical element including at least one data item corresponding to the at least one notification message within the notification area, the at least one data item being associated with a second application different from the first application.

The at least one data item may be further associated with at least one of a user interest and an event.

The computer-readable storage medium may store additional instructions which, when executed by the processor, cause the processor to: detect at least one of content and context of the at least one notification message using natural language processing (NLP); determine a relationship between the at least one of the content and the context of the at least one notification message and data items associated with a plurality of applications available in the electronic device; and identify the at least one data item associated with the second application, from the plurality of applications, based on the relationship.

The relationship may be determined by contextually linking the at least one of the content and the context of the at least one notification message with the data items associated with the plurality of applications available in the electronic device.

The computer-readable storage medium may store additional instructions which, when executed by the processor, cause the processor to group the at least one notification message to yield grouped notification messages, based on the first user input when the at least one notification message includes a plurality of notification messages.

Grouping the at least one notification message may further include: detecting at least one of content and context of the grouped notification messages using natural language processing (NLP); determining a relationship between the at least one of the content and the context of the grouped notification messages and the at least one data item associated with the second application; and determining the at least one data item based on the relationship.

The relationship may be determined by contextually linking the content of the grouped notification messages with the at least one data item associated with the second application.

BRIEF DESCRIPTION OF DRAWINGS

The above and/or other aspects, features, and advantages of various example embodiments of the present disclosure will be more apparent from the following description taken in conjunction with the accompanying drawings, in which.

DETAILED DESCRIPTION

Figure 1:
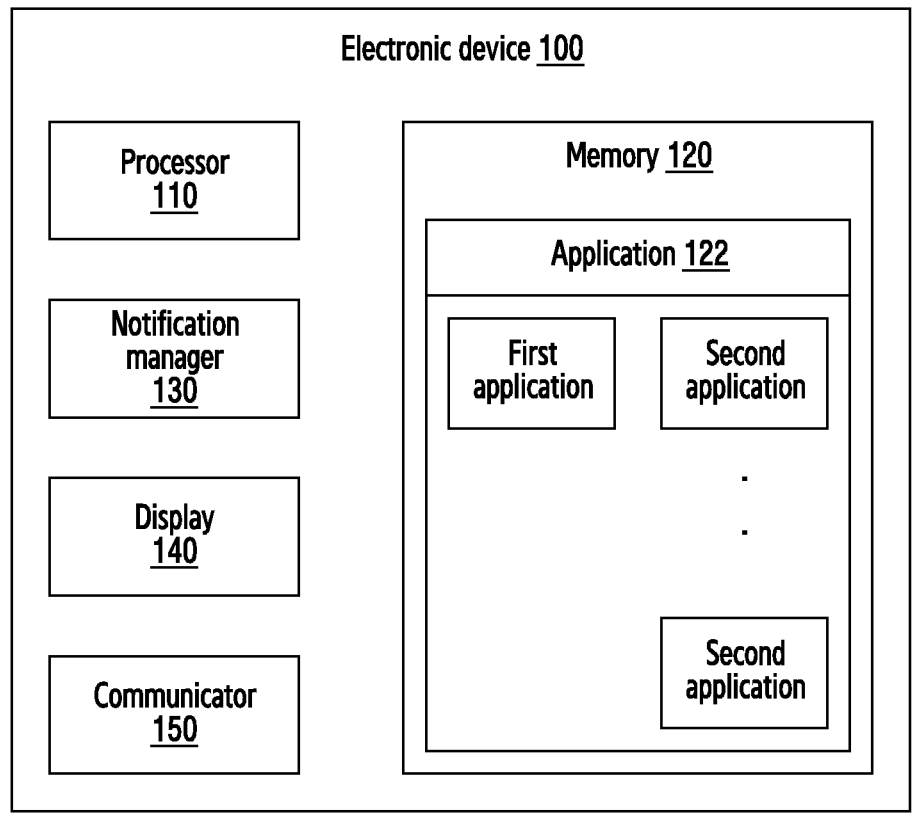
FIG. 1 illustrates an electronic device for managing notifications, according to an example embodiment.

Various example embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various example embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Example embodiments may be described and illustrated in terms of blocks which carry out a described function or functions. These blocks, which may be referred to herein as units or modules or the like, may be physically implemented (e.g., by analog and/or digital circuits such as logic gates, integrated circuits, microprocessors, microcontrollers, memory circuits, passive electronic components, active electronic components, optical components, hardwired circuits and the like), be implemented by firmware and/or software, or be implemented by a combination of hardware and software. The circuits may, for example, be embodied in one or more semiconductor chips, or on substrate supports such as printed circuit boards and the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Alternatively, one or more blocks may be implemented by software. Each block of the embodiments may be physically separated into two or more interacting and discrete blocks without departing from the scope of the disclosure. Likewise, the blocks of the embodiments may be physically combined into more complex blocks without departing from the scope of the disclosure.

Throughout the description, the terms "user equipment" and "electronic device" are used interchangeably. Further, the terms "at least one" and/or "one or more" are used interchangeably. Claim language reciting "at least one of" a set indicates that one member of the set or multiple members of the set satisfy the claim. Moreover, the word "exemplary" is used herein to mean "serving as an example or illustration." Any aspect or design described herein as "exemplary" is not necessarily to be construed as preferred or advantageous over other aspects or designs.

Prior to describing the embodiments in detail, it is useful to provide definitions for key terms used herein. Unless defined otherwise, all technical terms used herein have the same meaning as commonly understood by a person having ordinary skill in the art to which this invention belongs.

Natural language processing (NLP) is a field of computer science, artificial intelligence, and computational linguistics concerned with the interactions between computers and human (natural) languages. NLP is related to human-computer interaction.

Notification area is a portion of a user interface (UI) that displays notification messages. For example, the notification area may be a portion of the UI in a lock screen displaying one or more notification messages (e.g., email, SMS, etc.). The notification area may be, for instance, at the top of the screen, at the bottom of the screen, on the left side of the screen, on the right side of the screen, at a corner of the screen, etc.

Accordingly example embodiments herein provide a method for managing notifications in an electronic device. The method includes displaying by the electronic device at least one notification message associated with a first application in a notification area of the electronic device. Further, the method includes detecting an input performed on the at least one notification message displayed in the notification area. Furthermore, the method includes causing to display a graphical element comprising at least one data item corresponding to the notification message within the notification area, where the at least one data item is associated with at least one second application.

Unlike the conventional mechanism, the proposed method allows the user to effectively manage the events (i.e., future events) based on the context associated with the notification message.

Unlike the conventional mechanism, the proposed method allows the user to circumvent navigating from the current UI (e.g., current screen portion, current UX, lock screen, notification panel, etc.) to main menu (e.g., home screen, settings, etc.) of the electronic device in order to select the desire application(s) corresponding to the context associated with the notification message. Further, the proposed method allows the user to effectively manage the battery usage (i.e., consumed by display screen).

Accordingly example embodiments herein provide a method for managing notifications in an electronic device. The method includes displaying by the electronic device a plurality of notification messages in a notification area of the electronic device. Further, the method includes detecting a first input performed on at least one notification message from the plurality of notification messages. Further, the method includes grouping the at least one notification message based on the first input. Furthermore, the method includes detecting a second input performed on the grouped notification messages and causing to display a graphical element comprising at least one data item corresponding to the grouped notification messages within the notification area.

Unlike the conventional mechanism, the proposed method allows the user to group multiple notification messages (e.g., SMS, email, application specific messages directly from a vendor of the application, etc.) of the same source, thus improving the UX experience of the user.

Referring now to the drawings, and more particularly to FIGS. 1 through 11, these are shown as example embodiments.

FIG. 1 illustrates various unit of an electronic device 100 for managing notifications, according to an embodiment of the present disclosure.

Referring to FIG. 1, the electronic device 100 may access a network to achieve one or more functionalities associated therewith. The one or more functionalities such as communication services; telephone call, notification messages, and other types of data exchange services. The notification messages may include, for example, text messages such as Short Message Service (SMS), email, application notifications, etc.

The electronic device 100 may include a processor 110 (e.g., a hardware unit, an apparatus, a central processing unit (CPU), a graphics processing unit (GPU), etc.) communicatively coupled to a memory 120 (e.g., a volatile memory and/or a non-volatile memory) including storage configured to be addressable through the processor 110, a notification manager 130 coupled to the processor 110, a display 140 (e.g., a cathode ray tube (CRT), a liquid crystal display (LCD), an organic light-emitting diode (OLED), a light-emitting diode (LED), an electroluminescent display (ELD), a field emission display (FED), etc.) connected to the processor 110, and a communicator 150 configured to communicate with the network and communicate internally between the various units.

The memory 120 may store applications 122 (including information about the applications, etc.) to provide one or more services to the user. For example, a music application is configured to play music track for the user. The memory 120 may also be accessed by the applications through a network (i.e., cloud based). The applications 122 may include, for example, first application(s), second application(s), etc., configured to be accessed through one or more instructions received from the notification manager 130. In another example embodiment, the first application(s), second application(s), etc., can be accessed through one or more instructions received from the processor 110.

The functionality of the notification manager 130 is detailed in conjunction with FIG. 2, described below.

FIG. 1 shows exemplary units of the electronic device 100 but it is to be understood that other embodiments are not limited thereon. In other example embodiments, the electronic device 100 may include fewer or more units. Further, the labels or names of the units are used only for illustrative purpose and do not limit the scope of the disclosure. One or more units can be combined together to perform same or substantially similar function in the electronic device 100.

Figure 2:
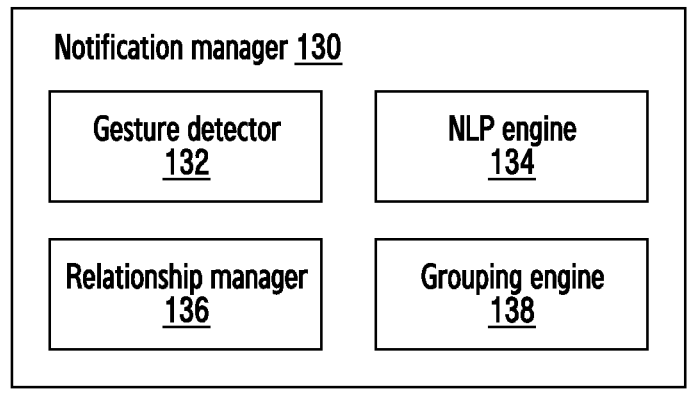
FIG. 2 illustrates various units of a notification manager of the electronic device, according to an example embodiment.

FIG. 2 illustrates various units of the notification manager 130, according to an example embodiment.

Referring to FIG. 2, the notification manager 130 can include a gesture detector 132, a natural language processing (NLP) engine 134, a relationship manager 136, and a grouping engine 138. Each of these components may be implemented with hardware, software, or a combination of both.

The notification manager 130 coupled (e.g., communicatively coupled) to the display 140, may display at least one notification message associated with the first application in the notification area. The first application may be, for example, an e-commerce application, a social network service (SNS) application, an email application, a service-related application, a weather application, or any other application associated with the electronic device 100. The first application, as discussed above, may be a remote application accessed through a network.

Further, the notification manager 130 may detect the input on the one or more notification messages. The gesture detector 132 may identify various gestures provided, by means of the input on the display 140. The various gestures may include, for example, a long tap, a double tap, a swipe, a rail, a pinch, a system-defined input, a user-defined input, etc.

Further, the notification manager 130 may display the graphical element including at least one data item corresponding to the notification message within the notification area, where the data item is associated with at least one second application.

The graphical element represents a portion of area within the notification area of the electronic device 100 in which the plurality of data items associated with at least one second application is rendered thereof. The data items represent graphical objects (i.e., icons) denoting the second application.

The second application may be, for example, an e-commerce application, a social network service (SNS) application, an email application, a service-related application, a weather application, and any other applications associated with the electronic device 100. The second application, as discussed above, may be a remote application accessed through a network.

The NLP engine 134 may detect the content and context of the notification message associated with the first application. The context may include, for example, weather-related context, event-related context, service-related context, location-related context (e.g., global positioning system (GPS) coordinates), or the like.

In an example, once the notification manager detects the input on the notification message, the NLP engine 134 may identify the text strings associated with the content of the notification message. Further, the NLP engine 134 may extract/recommend the relevant applications based on the identified text strings.

Further, the relationship manager 136, coupled to the NLP engine 134, may determine a relationship between the content and context of the notification message, and at least one data item associated with a plurality of second applications of the electronic device 100. The relationship manager 136 may contextually link the content of the notification message with the at least one data item associated with the plurality of second applications of the electronic device 100. The contextually linking may be, for example, an event (e.g., scheduled meeting) associated with the notification message mapped with the current weather conditions (i.e., context) around the user of the electronic device 100.

For example, if the content of the notification message includes "meet today at 5," the relationship manager 136 may determine (e.g., using weather sensors, weather forecast applications, etc.) that the weather (i.e., context) "today" at "5:00 p.m." may change (e.g., rainy) and cause the display 140 to display the data item of the weather application within the notification area of the electronic device 100.

Furthermore, the notification manager 130 may determine (e.g., identify) the data item associated with the second application, from the plurality of second applications, based on the relationship provided by the relationship manager 136, as discussed above.

Unlike the conventional mechanism, the proposed notification manager 130 recommends/renders the relevant applications (i.e., data items of the second applications) within the notification area without accessing (e.g., opening) the first application and the second application.

Unlike the conventional mechanism, where the recommendations are provided by analyzing each text string which the user provides (via typing or any other means) in an active application, the proposed notification manager 130 displays the data items of the second application based on the input provided on the notification message of the first application (e.g., inactive application).

Further, the notification manager 130 may display a plurality of notification messages in a notification area of the electronic device 100. Further, the notification manager 130 may detect a first input, on display 140, performed on at least one notification message from the plurality of notification messages. Further, the notification manager 130 may group, through grouping engine 138, at least one notification message based on the first input. Further, the notification manager 130 may detect a second input performed on the grouped notification messages, and display a graphical element including at least one data item corresponding to the grouped notification messages within the notification area. The number of notification messages to be grouped may be automatically selected (e.g., without the user specifying the number) based on an area associated with (e.g., covered by) the a user input (e.g., the first user input or the second user input) and the notification messages on which the user input is performed.

At least one data item corresponding to the notification message may be displayed within the notification area without opening the associated application. For example, an artificial intelligence (AI) engine may perform structurally repetitive automated searching tasks (scripts) and may invoke along with the reception of the notification message.

Figure 3:
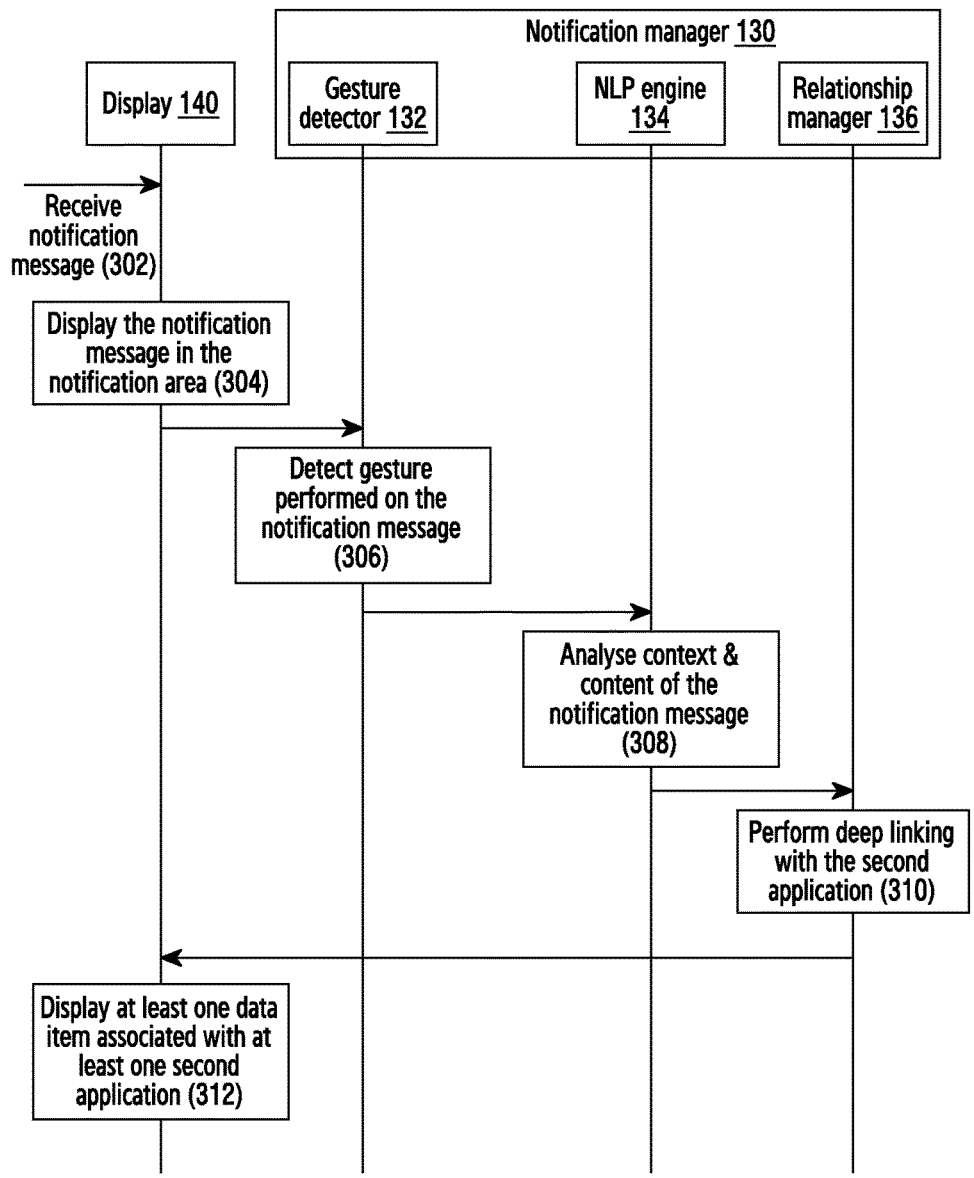
FIG. 3 is a sequence diagram illustrating various exemplary messages exchanged between a display and a notification manager for managing notification messages, according to an example embodiment.

FIG. 3 is a sequence diagram illustrating various exemplary messages exchanged between the display 140 and the notification manager 130 for managing the notification messages, according to an example embodiment.

Initially, the communicator 150 may receive the notification message from the source (e.g., another electronic device, server, application vendor, etc.) through the network (e.g., Wi-Fi, cellular, Bluetooth, etc.). The communicator 150 may communicate with the processor 120 therefrom, and the processor 120 may provide instructions to the display 140. The display 140 may receive a notification message (302), and display the notification message in the notification area (304).

The display 140 may further detect an input on the notification message, and the gesture detector 132 may detect the gesture performed by the user (306), in the form of the input, on the notification message. Once the gesture is detected, the NLP engine 134 may analyze the content and context of the notification message (308). The output of the NLP engine 134 may be communicated to the relationship manager 136. The relationship manager 136 may perform deep linking (i.e., based on the context, contextual deep linking) with the applications (e.g., second applications) of the electronic device 100 (310). Furthermore, the output of the relationship manager 136 may be provided to the display 140. The display 140 may display at least one data item associated with at least one second application (312) based on the relationship determined by the relationship manager 136.

Figure 4:
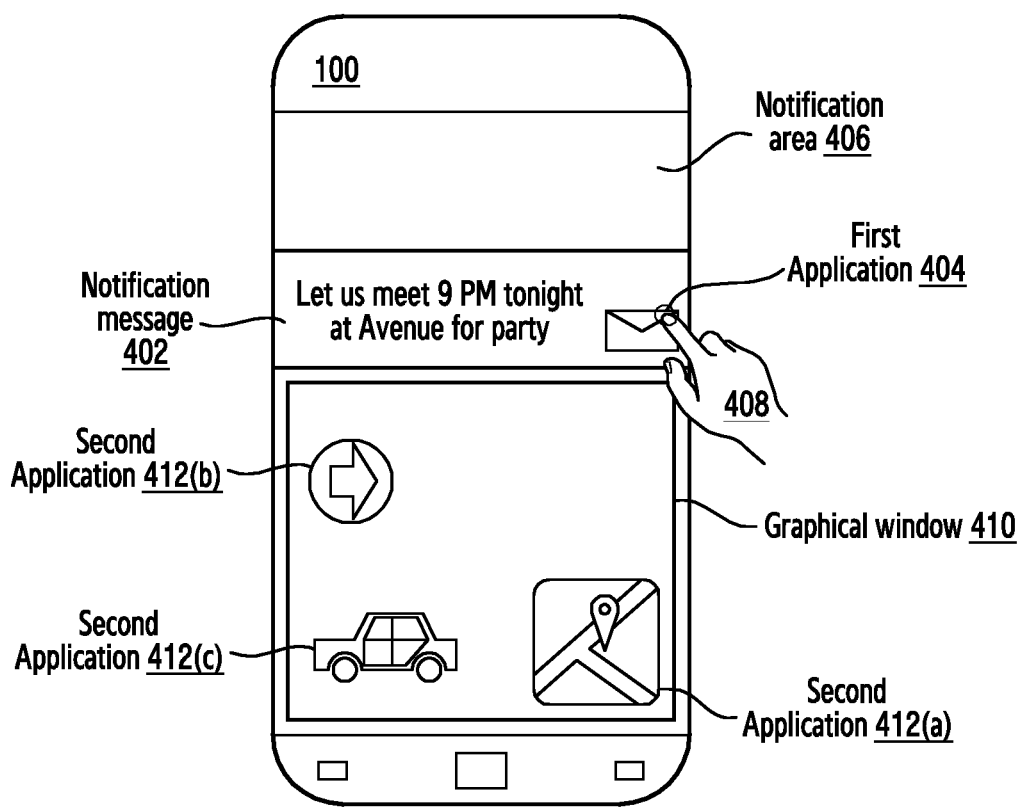
FIG. 4 illustrates an example UI of the electronic device in which the one or more second applications corresponding to a context of a notification message are displayed, according to an example embodiment.

FIG. 4 illustrates an example UI of the electronic device 100 in which one or more second applications corresponding to the context of the notification message are displayed, according to an example embodiment.

Consider a scenario in which the electronic device 100 receives a notification message 402 associated with a first application 404 (e.g., an SMS application) from another electronic device. The notification message 402 may read, for example, "Let us meet 9 PM tonight at Avenue for party." The electronic device 100 may display the notification message 402 in a notification area 404 (e.g., notification panel, lock screen UI, or any portion of the display 140 where the reception of the notification messages is defined).

The display 140 may detect an input 408 on the notification message 402. Thus, the gesture detector 132 may detect the gesture performed by the user during the input 408. Thus, based on the input 408 provided, the NLP engine 134 may detect at least one of the content and the context of the notification message 402 associated with the first application 404 using a NLP technique (e.g., artificial intelligence). For example, the NLP engine 134 may analyze and identify the attributes (e.g., keywords) of the content and context, attributes such as "9 PM," "tonight," "avenue," "party," etc.

The output of the NLP engine 134 (e.g., determined attributes) may be communicated to the relationship manager 136, which determines the relationship between these attributes and at least one data item associated with the plurality of second applications (412(*a*), 412(*b*), 412 (*c*), etc.) of the electronic device 100.

Further, based on the relationship determined as discussed above, the notification manager 130 may determine at least one data item associated with at least one second application (412(*a*), 412(*b*), 412 (*c*), etc.) from the plurality of second applications, based on the relationship.

Thus, the relationship manager 136 may determine the relationship between the attribute "9 PM" with a calendar application, and identify whether any meeting is already scheduled at "9 PM", and display the bookmarked event, if any, within the notification area 406.

Similarly, a relationship between the attribute "tonight" and the weather/calendar application may be determined to provide the weather forecast tonight, and display the weather application within the notification area 406.

Similarly, a relationship between the attribute "avenue", a location application, and a mode of transportation (e.g., a taxi) may be determined, and traffic updates at "9 PM tonight" and the location application may be displayed within the notification area 406.

Similarly, the attribute "party" in conjunction with all the above attributes may display a party venue reservation application within the notification area 406.

Thus, the notification manager 130 may display the data items of the second applications (412(*a*), 412(*b*), 412(*c*), etc.) corresponding to the notification message 402 within the notification area 406. Thus, the electronic device 100 may help the user by providing all the relevant applications associated with the content and context of the notification message 402 within the notification area 406.

Unlike a conventional mechanism, the proposed method provides a better user experience to the user of the electronic device 100.

Figure 5:
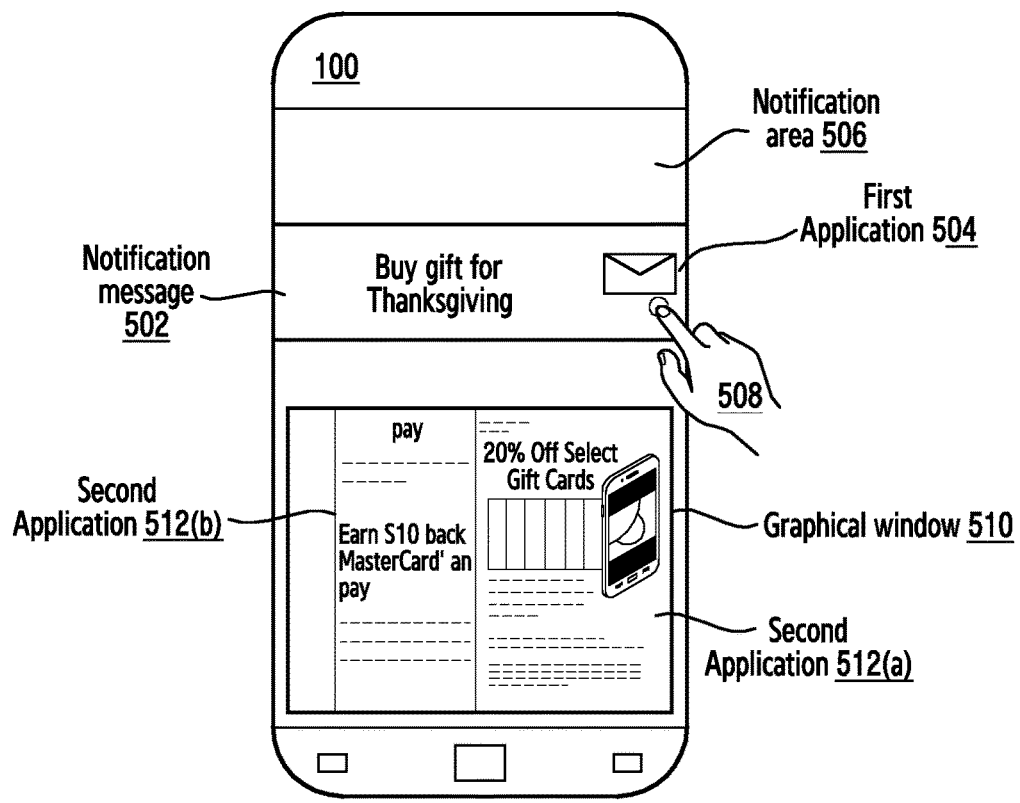
FIG. 5 illustrates another example UI of an electronic device in which one or more second applications corresponding to a context of the notification message are displayed, according to an example embodiment.

FIG. 5 illustrates another example UI of the electronic device 100 in which one or more second applications corresponding to the context of the notification message are displayed, according to an example embodiment.

Consider a scenario in which the electronic device 100 receives a notification message 502 associated with a first application 504 (e.g., an SMS application) from another electronic device. The notification message 502 may read, for example, "Buy gift for Thanksgiving." The electronic device 100 may display the notification message 502 in a notification area 504 (e.g., notification panel, lock screen UI, or any portion of the display 140 where the reception of the notification messages is defined).

The display 140 may detect an input 508 on the notification message 502. Thus, the gesture detector 132 may detect the gesture performed by the user during the input 508. Thus, based on the input 508 provided, the NLP engine 134 may detect at least one of the content and the context of the notification message 502 associated with the first application 504 using a NLP technique. For example, the NLP engine 134 may analyze and identify the attributes of the content and context, attributes such as "Buy," "gift," "Thanksgiving."

The output of the NLP engine 134 (e.g., determined attributes) may be communicated to the relationship manager 136, which may determine the relationship between these attributes and at least one data item associated with the plurality of second applications (512(*a*), 512(*b*), etc.) of the electronic device 100.

Further, based on the relationship determined as discussed above, the notification manager 130 may determine at least one data item associated with at least one second application (512(*a*), 412(*b*), etc.) from the plurality of second applications, based on the relationship.

Thus, the relationship manager 136 may determine the relationship between the attribute "Buy" with a payment application, and display the payment application within the notification area 506.

Similarly, a relationship between the attribute "gift" in conjunction with attributes "buy" and "Thanksgiving" and an e-commerce/shopping application may be determined, and the e-commerce application may be displayed within the notification area 406.

Figure 6:
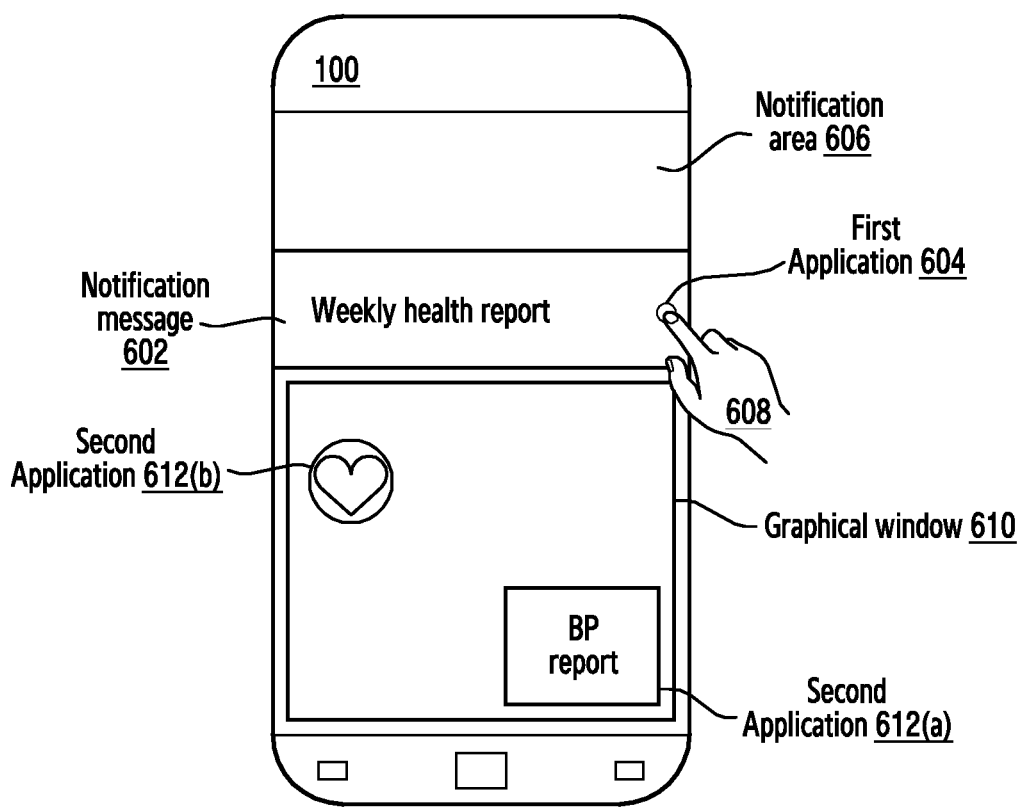
FIGS. 6, 7A and 7B are yet another example UIs of an electronic device for managing one or more notification messages, according to an example embodiment.
Figure 7A:
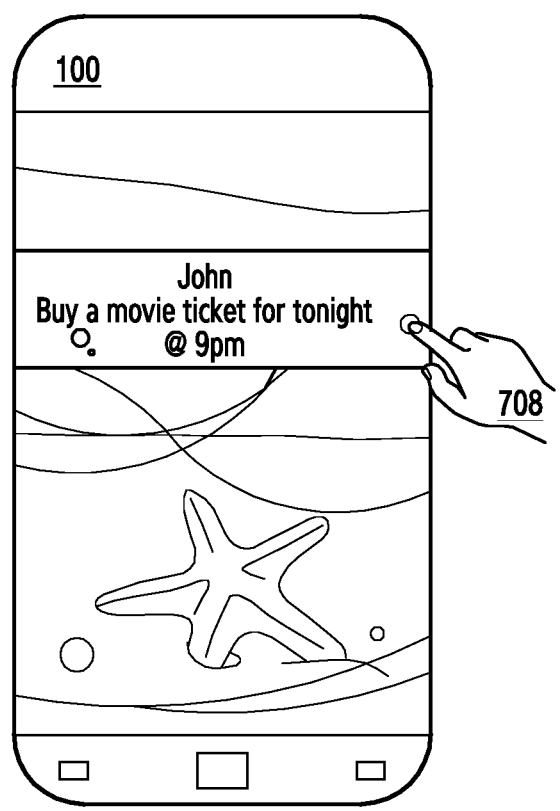
Figure 7B:
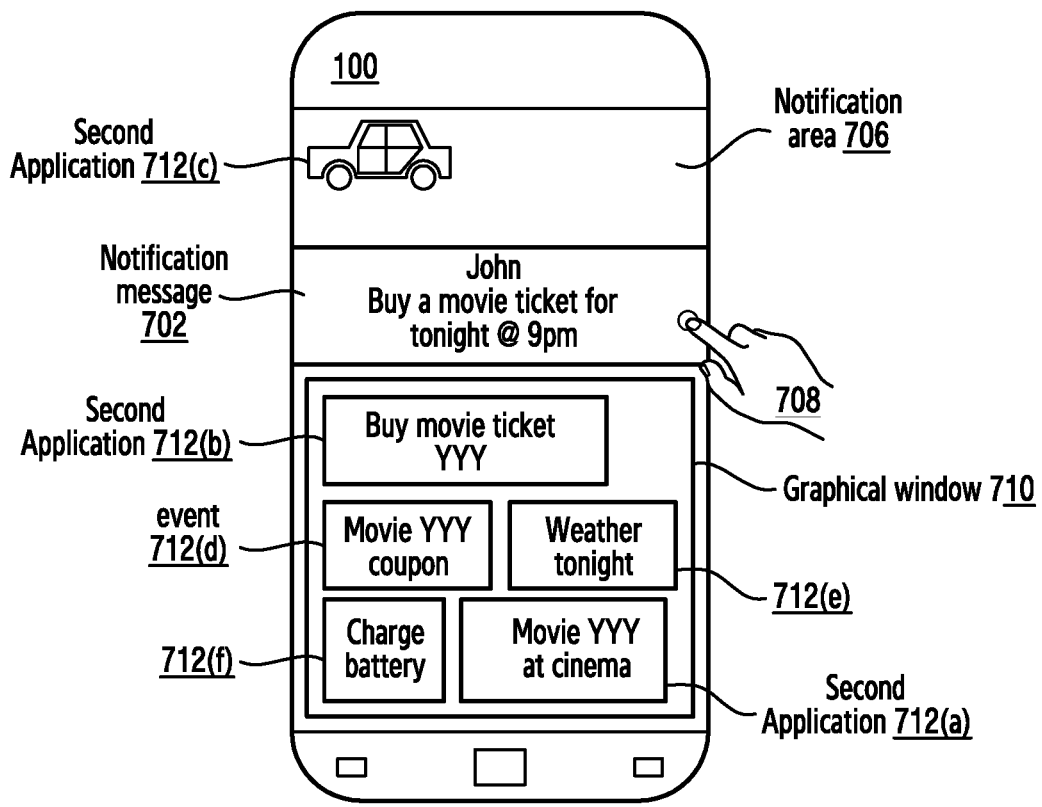

FIGS. 6, 7A, and 7B illustrate yet other example UIs in which similar features to those of FIGS. 4 and 5 are detailed, and redundant explanation to these are avoided for the sake of brevity.

With respect to FIG. 6, the electronic device 100 may receive a notification message 602 associated with a first application 604 (e.g., a health service application) installed in the electronic device 100. The notification message 602 may read, for example, "Weekly health report."

Upon detecting an input 608 made on the notification message 602 of the display 140, at least one of the content and the context of the notification message 602 may be identified and analyzed to output attributes thereof such as "weekly," "health," and "report."

The outputted attributes such as "weekly," "health," and "report" are utilized to find a relationship with at least one data item associated with the plurality of second applications (612(*a*), 612(*b*), etc.) of the electronic device 100.

Alternatively or additionally, the outputted attributes such as "weekly," "health," and "report" are utilized to find a relationship with at least one data item associated with a user interest or events provided by the electronic device 100.

The outputted attributes such as "weekly," "health," and "report" are compared with at least one data item associated with a user interest or events provided by the electronic device 100. The user interest or events may be extracted from information sources such as text, images, music, movies, or any items in the electronic device 100, in another electronic device, or on the Internet, related to activities or events performed or generated through the electronic device 100.

With respect to FIG. 7A, the electronic device 100 may receive a notification message 702 while executing a first application 704. The received notification message 702 may not be associated with the first application 704 currently being executed in the electronic device 100. Alternatively, the electronic device 100 may receive and display the notification message 702 any time without executing any application such as during the idle state, or in a lock screen.

Upon detecting an input 708 made on the notification message 702 of the display 140, at least one of the content and the context of the notification message 702 (e.g., "Buy a movie ticket for tonight") may be identified and analyzed to output attributes thereof such as "buy," "movie," "tonight."

The outputted attributes such as "buy," "movie," and "tonight" are utilized to find a relationship with at least one data item associated with the plurality of second applications including applications (712(a), 712(b), 712(c) etc.) of the electronic device 100. The second applications ((712(a), 712(b), 712(c)) are displayed within the notification area 706 based on the determined relationship between their associated data items and the outputted attributes of the notification message 702 as shown in FIG. 7B.

Alternatively or additionally, the outputted attributes such as "buy," "movie," and "tonight" are utilized to find a relationship with at least one data item associated with a user interest or events such as a movie coupon (712(d)) or weather of "tonight" provided by the electronic device 100. The electronic device 100 displays information associated with the movie coupon (712(d)) and the weather of tonight (712(f)) applications such as "rainy tonight, bring an umbrella!"

Further, the outputted attributes such as "buy," "movie," and "tonight" are utilized to find a relationship with at least one data item associated with a current state of the electronic device 100. The electronic device 100 checks the status thereof associated with these attributes. For example, the electronic device 100 checks the status of remaining battery power and if the battery level is not enough to last until "tonight," then a notification to charge the battery (712(f)) may be displayed.

Figure 8:
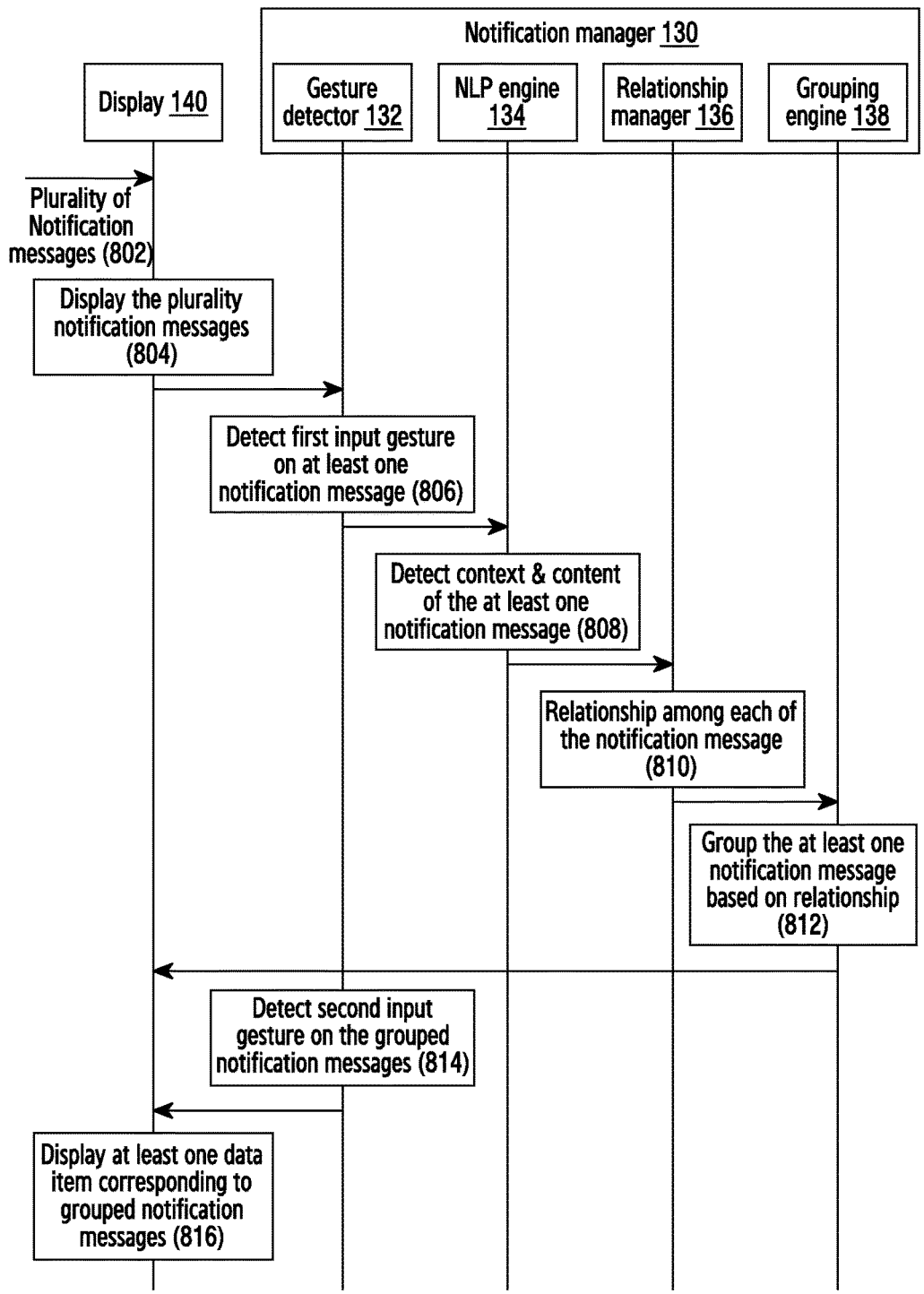
FIG. 8 is a sequence diagram illustrating various exemplary messages exchanged between a display and a notification manager for grouping of notification messages, according to an example embodiment.

FIG. 8 is a sequence diagram illustrating various exemplary messages exchanged between the display 140 and the notification manager 130 for grouping of the notification messages, according to an example embodiment.

Initially, the communicator 150 may receive a plurality of notification messages from a source (e.g., from another electronic device, server, application vendor, etc.) through a network (e.g., Wi-Fi, cellular, Bluetooth, etc.). The communicator 150 may communicate with the processor 120 therefrom, the processor 120 may provide instructions to the display 140. The display 140 may receive the plurality of notification messages (802), and display the plurality of notification messages in the notification area (804).

The display 140 may further detect a first input on the notification message, and the gesture detector 132 may detect the gesture performed by the user, in the form of the first input, on the notification message (806).

Once the gesture is detected, the NLP engine 134 may detect the content and context of the at least one notification message (808). The output of the NLP engine 134 may be communicated to the relationship manager 136. The relationship manager 136 may determine a relationship among each of the notification message from the plurality of notification messages (810). For example, one or more notification messages received from the same source, redundant content among the one or more notification messages, or the like may be identified. Further, the grouping engine 138 may group at least one notification message based on the relationship (812).

Further, the gesture detector 132 may detect the second input by performing a gesture on the grouped notification messages (814) provided by the grouping engine 138. Thus, based on the second input, the relationship manager 136 may perform deep linking (e.g., based on the context, contextual deep linking) with the applications (e.g., second applications) of the electronic device 100. Furthermore, the output of the relationship manager 136 may be provided to the display 140. The display 140 may display at least one data item corresponding to grouped notification messages (816).

Figure 9A:
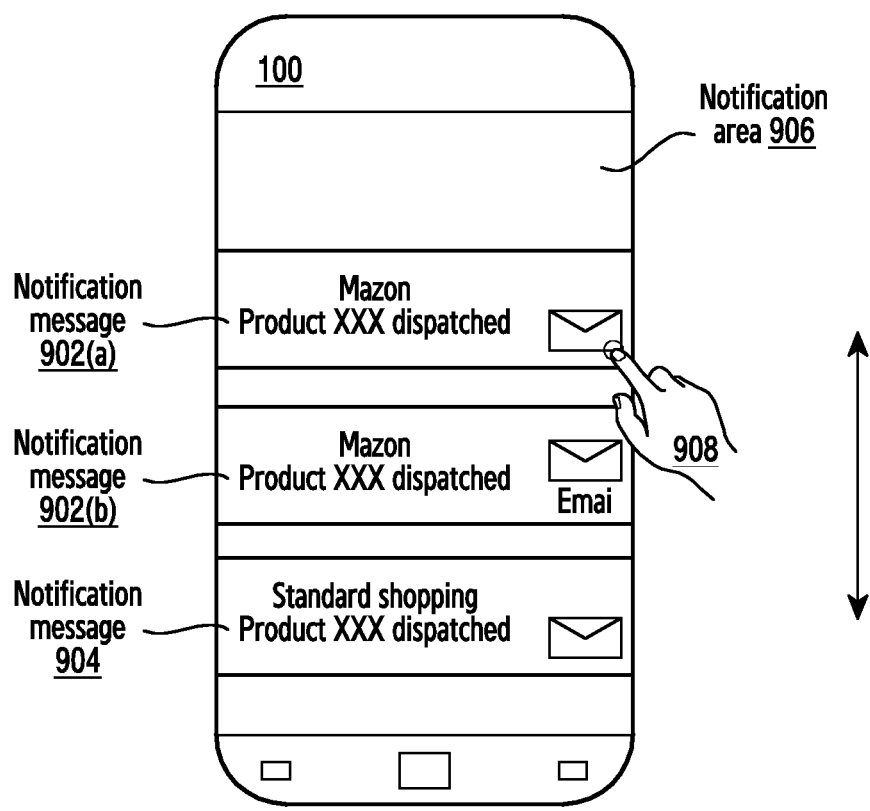
FIGS. 9A and 9B illustrates another example UI's of the electronic device in which grouping of the notification messages is performed, according to an example embodiment.
Figure 9B:
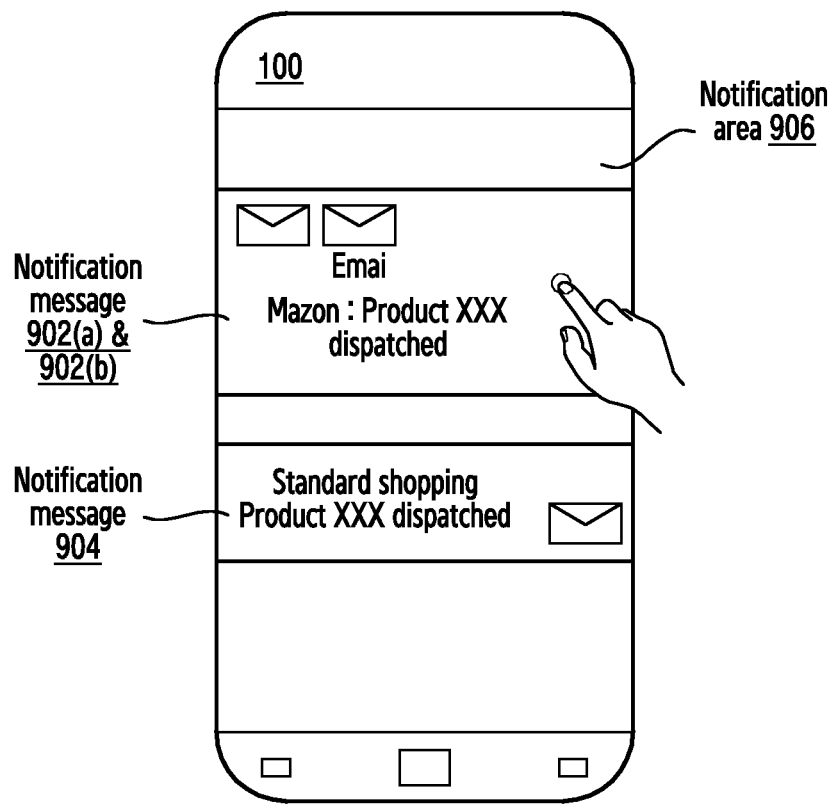

FIGS. 9A and 9B illustrates example UIs of the electronic device 100 in which grouping of the notification messages is performed, according to an example embodiment.

Consider a scenario in which the electronic device 100 receives a plurality of notification messages 902(a), 902(b), and 904. The display 140 may detect a first input by way of gesture provided by the user. The gesture detector 132 may detect the gesture performed by the user. Further, upon receiving the first input, the NLP engine 134 may be invoked to identify the content of the plurality of the notification messages 902(a), 902(b), and 904, as shown in FIG. 9A.

Further, the relationship manager 136 may determine the relationship among each of the notification messages 902(a), 902(b), and 904, and based on the relationship (e.g., notification messages 902(a) and 902 (b) are from same source, contains redundant content), the grouping engine 138 may group (i.e., combine or merge) the notification messages 902(a) and 902(b), as shown in FIG. 9B.

Unlike a conventional mechanism, the proposed notification manager 130 may filter notifications across single and group messaging platforms with emphasis on an improved user experience and more efficient battery consumption. It also provides effective content management and edge screen utilization. It also creates user-initiated events on the edge screen.

Figure 10:
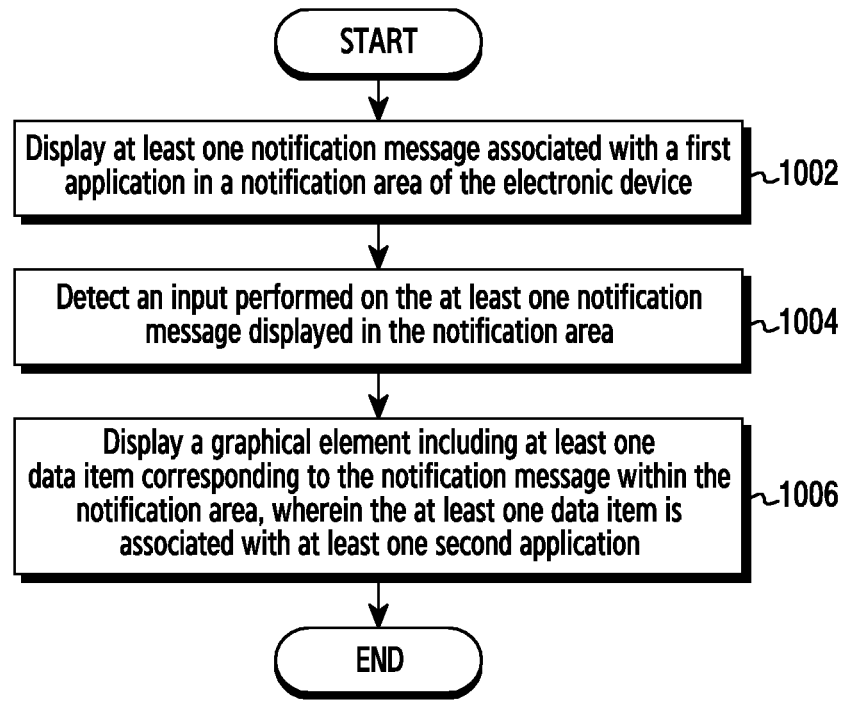
FIG. 10 is a flow diagram illustrating a method for displaying one or more data items corresponding to the context and content of the notification message, according to an example embodiment.

FIG. 10 is a flow diagram illustrating a method for displaying one or more data items corresponding to the context and content of the notification message, according to an example embodiment.

Referring to FIG. 10, at operation 1002, the electronic device 100 may display at least one notification message associated with a first application in a notification area of the display 140. For example, in the electronic device 100 as illustrated in FIG. 1, the notification manager 130 may display at least one notification message associated with the first application in the notification area of the display 140.

At operation 1004, the electronic device 100 may detect the input performed on at least one notification message displayed in the notification area of the display 140. For example, in the electronic device 100 as illustrated in FIG. 1, the notification manager 130 may detect the input performed on the at least one notification message displayed in the notification area of the display 140.

At operation 1006, the electronic device 100 may display a graphical element comprising the, including at least one data item corresponding to the notification message, within the notification area of the display 140, where the data item is associated with at least one second application. For example, in the electronic device 100 as illustrated in FIG. 1, the notification manager 130 may display the graphical element including at least one data item corresponding to the notification message within the notification area of the display 140, where at least one data item is associated with at least one second application.

The various actions, acts, blocks, steps, operations, etc., as illustrated in FIG. 10 may be performed in the order presented, in a different order, or simultaneously. Further, in some example embodiments, some of the actions, acts, blocks, steps, operations, etc., may be omitted, added, modified, skipped, etc., without departing from the scope of the disclosure.

Figure 11:
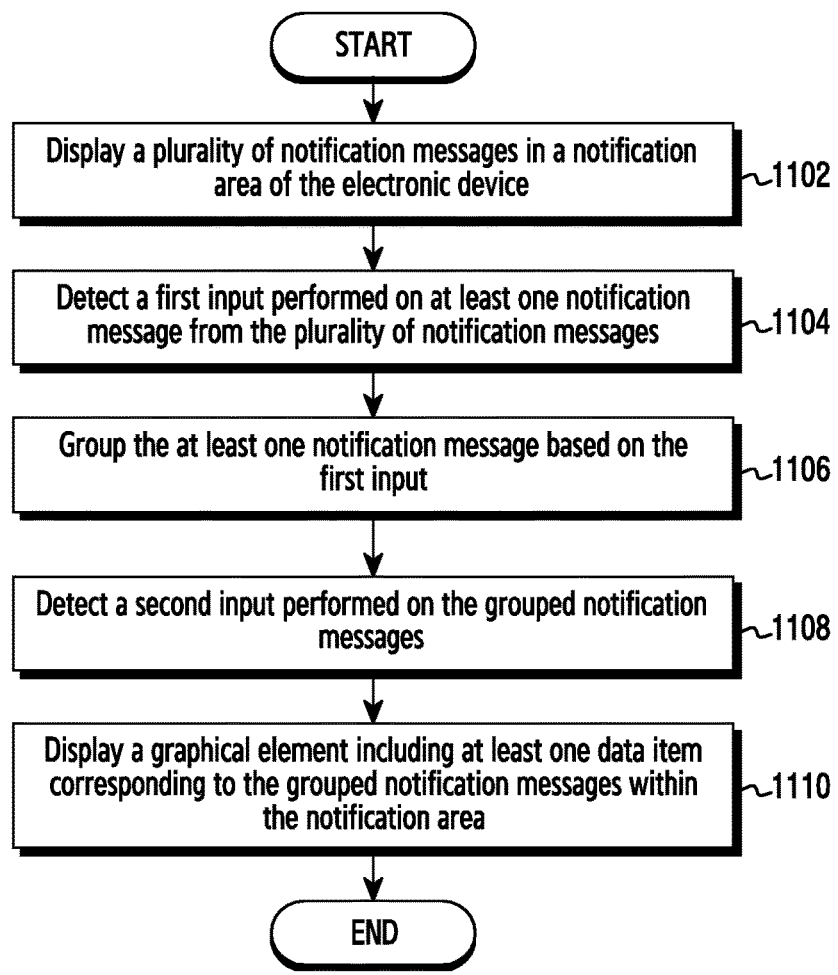
FIG. 11 is a flow diagram illustrating a method for grouping the one or more notification messages based on the content and context associated thereof, according to an example embodiment.

FIG. 11 is a flow diagram illustrating a method for grouping one or more notification messages based on the content and context associated thereof, according to an example embodiment.

Referring to FIG. 11, at operation 1102, the electronic device 100 may display a plurality of notification messages in a notification area of the display 140. For example, in the electronic device 100 as illustrated in FIG. 1, the notification manager 130 may display the plurality of notification messages in the notification area of the display 140.

At operation 1104, the electronic device 100 may detect the first input performed on at least one notification message from the plurality of notification messages. For example, in the electronic device 100 as illustrated in FIG. 1, the notification manager 130 may detect the first input performed on at least one notification message from the plurality of notification messages.

At operation 1106, the electronic device 100 may group at least one notification message based on the first input. For example, in the electronic device 100 as illustrated in FIG. 1, the notification manager 130 may group at least one notification message based on the first input.

At operation 1108, the electronic device 100 may detect the second input performed on the grouped notification messages. For example, in the electronic device 100 as illustrated in FIG. 1, the notification manager 130 may detect the second input performed on the grouped notification messages.

At operation 1110, the electronic device 100 may display a graphical element including at least one data item corresponding to the grouped notification messages within the notification area. For example, in the electronic device 100 as illustrated in FIG. 1, the notification manager 130 may display the graphical element including at least one data item corresponding to the grouped notification messages within the notification area.

The various actions, acts, blocks, steps, operations, etc., as illustrated in FIG. 11 may be performed in the order presented, in a different order, or simultaneously. Further, in some example embodiments, some of the actions, acts, blocks, steps, operations, etc., may be omitted, added, modified, skipped, etc., without departing from the scope of the disclosure.

According to an aspect of an example embodiment, users may be provided with a list of events to be chosen using gesture-based NLP based on the notification content received.

The example embodiments disclosed herein may be implemented using at least one software program running on at least one hardware device and performing network management functions to control the elements.

The foregoing description of the specific embodiments will so fully reveal the general nature of the example embodiments herein that others can, by applying current knowledge, readily modify and/or adapt for various applications such specific example embodiments without departing from the generic concept, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, those skilled in the art will recognize that the example embodiments herein may be practiced with modification within the spirit and scope of the example embodiments as described herein.

What is claimed is:

1. A method for managing notifications in an electronic device, the method comprising:
receiving a notification message associated with a first application and displaying the notification message, in a first portion of a notification area in a lock screen, without executing the first application, wherein the notification area is less than an entire area of a display of the electronic device and wherein the notification message includes time information;
detecting a first user input performed on the notification message displayed in the first portion of the notification area;
in response to detecting the first user input on the notification message, analyzing at least one of content and context of the received notification message; and
further displaying a graphical element in a second portion of the notification area in the lock screen based on analysis of the notification message, while displaying the notification message in the first portion of the notification area and maintaining a position of the notification message in the first portion of the notification area,
wherein the displaying of the graphical element comprises:
based on analysis of the notification message, displaying a second application associated with the notification message in the second portion of the notification area without executing the second application, the second application being different from the first application, identifying a data item of an event associated with the time information of the notification message and displaying the data item in the second portion of the notification area, and checking a current state of the electronic device associated with the notification message and displaying a notification associated with the current state on the second portion of the notification area.

2. The method of claim 1, wherein the displaying of the graphical element comprises identifying and displaying a data item associated with a user interest.

3. The method of claim 1, wherein the analyzing of at least one of content and context of the received notification message comprises:
detecting at least one of the content and the context of the notification message using natural language processing (NLP);
determining a relationship between the at least one of the content and the context of the notification message and data items associated with a plurality of applications available in the electronic device; and
identifying a data item associated with the second application, from the plurality of applications, based on the relationship.

4. The method of claim 3, wherein the relationship is determined by contextually linking the at least one of the content and the context of the notification message with the data items associated with the plurality of applications available in the electronic device.

5. The method of claim 1, wherein a plurality of notification messages are displayed in the first portion and the method further comprises grouping the plurality of notification messages to yield grouped notification messages, based on the first user input.

6. The method of claim 5, further comprising detecting a second user input performed on the grouped notification messages, wherein the graphical element is displayed within the notification area based on the second user input.

7. The method of claim 5, wherein the grouping the plurality of notification messages further comprises:
   detecting at least one of content and context of the plurality of notification messages based on the first user input;
   determining a relationship among the plurality of notification messages; and
   grouping the plurality of notification messages based on the relationship.

8. The method of claim 7, wherein the relationship is determined by contextually linking first content of one notification message with second content of another notification message from the plurality of notification messages based on the first user input.

9. The method of claim 7, wherein a number of notification messages, from the plurality of notification messages, for grouping is automatically selected based on at least one of an area covered by the first user input and the plurality of notification messages on which the first user input is performed.

10. The method of claim 5, wherein the grouping the plurality of notification messages further comprises:
    detecting at least one of content and context of the grouped notification messages using natural language processing (NLP);
    determining a relationship between the at least one of the content and the context of the grouped notification messages and a data item associated with the second application; and
    determining the data item associated with the second application based on the relationship.

11. The method of claim 10, wherein the relationship is determined by contextually linking the content of the grouped notification messages with the data item associated with the second application.

12. The method of claim 11, wherein the data item associated with the second application is displayed within the notification area without opening the second application.

13. An electronic device for managing notifications, the electronic device comprising:
    a processor; and
    a computer-readable storage medium storing instructions which, when executed by the processor, cause the processor to:
        receive a notification message associated with a first application and display the notification message, in a first portion of a notification area in a lock screen, without executing the first application, wherein the notification area is less than an entire area of a display of the electronic device and wherein the notification message includes time information;
        detect a first user input performed on the notification message displayed in the first portion of the notification area;
        in response to detecting the first user input on the notification message, analyze at least one of content and context of the received notification message; and
        further display a graphical element in a second portion of the notification area in the lock screen based on analysis of the notification message, while displaying the notification message in the first portion of the notification area and maintaining a position of the notification message in the first portion of the notification area,
    wherein the displaying of the graphical element comprises:
        based on analysis of the notification message, displaying a second application associated with the notification message in the second portion of the notification area without executing the second application, the second application being different from the first application, identifying a data item of an event associated with the time information of the notification message and displaying the data item in the second portion of the notification area, and checking a current state of the electronic device associated with the notification message and displaying a notification associated with the current state in the second portion of the notification area.

14. The electronic device of claim 13, wherein the displaying of the graphical element comprises identifying and displaying a data item associated with a user interest.

15. The electronic device of claim 13, wherein the computer-readable storage medium stores additional instructions which, when executed by the processor, cause the processor to:
    detect at least one of content and context of the notification message using natural language processing (NLP);
    determine a relationship between the at least one of the content and the context of the notification message and data items associated with a plurality of applications available in the electronic device; and
    identify a data item associated with the second application, from the plurality of applications, based on the relationship.

16. The electronic device of claim 15, wherein the relationship is determined by contextually linking the at least one of the content and the context of the notification message with the data items associated with the plurality of applications available in the electronic device.

17. The electronic device of claim 13, wherein a plurality of notification messages are displayed in the first portion and wherein the computer-readable storage medium stores additional instructions which, when executed by the processor, cause the processor to group the plurality of notification messages to yield grouped notification messages, based on the first user input.

18. The electronic device of claim 17, wherein the grouping the plurality of notification messages further comprises:
    detecting at least one of content and context of the grouped notification messages using natural language processing (NLP);
    determining a relationship between the at least one of the content and the context of the grouped notification messages and a data item associated with the second application; and
    determining the data item associated with the second application based on the relationship.

19. The electronic device of claim 18, wherein the relationship is determined by contextually linking the content of the grouped notification messages with the data item associated with the second application.

* * * * *